Patented Jan. 19, 1932

1,841,599

UNITED STATES PATENT OFFICE

BEN F. HARDESTY, OF PITTSBURGH, PENNSYLVANIA, ASSIGNOR TO REFINED STEEL PRODUCTS COMPANY, OF PITTSBURGH, PENNSYLVANIA, A CORPORATION OF DELAWARE

METHOD OF TREATING NONFERROUS METALS

No Drawing.  Application filed January 9, 1930.  Serial No. 419,749.

The present invention relates to improvements in the refining of the non-ferrous metals and their alloys and also to improvements in the metals so refined. A principal object of the invention is to provide a process of refining which is performed on the metal preferably just prior to pouring, and which eliminates impurities therein to a substantial degree so that the refined metal has superior physical properties. Although my invention is applicable to other non-ferrous metals, I have illustrated it by giving in detail a method for the purification of aluminum or alloys containing a large proportion of aluminum.

In carrying out my invention, I introduce within the bath a mixture of substances which includes a purifying or scavenging agent and a propelling or disseminating agent. The disseminating agent is a substance or a mixture of substances which when introduced within the bath of metal, reacts more or less suddenly to liberate quantities of a gas or gases which are effective to distribute or disseminate the purifying agent throughout the quantity of metal present. The disseminating agent may also have certain purifying action by virtue of the gases liberated by it, as will be set forth below.

As a purifying agent, I have discovered that the oxides and oxy-salts of barium are of peculiar efficacy. More specifically I have discovered that they have the property to a unique degree of reacting with the non-metallic impurities in these metals to produce compounds which are easily eliminated from the molten metal, thus greatly increasing its purity.

In the treatment of non-ferrous metals, particularly aluminum, it is desirable that the melting point of the barium compounds be so chosen as to be below that of the bath of metal to which the material is added, in order that these compounds may be in a most favorable state for combination with the impurities. The temperatures at which the oxides of barium melt are higher than those available in the melting of aluminum and other non-ferrous metals. However, by compounding with the barium oxide, for example, other oxides or salts either of barium itself or of other metals, the melting point of the mixture may be sufficiently lowered.

The following is a specific example of a composition which I have found suitable:

|  | Parts by weight |
|---|---|
| Barium monoxide (BaO) | 70 |
| Barium carbonate ($BaCO_3$) | 7 |
| Sodium fluoride (NaF) | 14 |
| Potassium chlorate ($KClO_3$) | 6 |
| Carbon (C) | 3 |
|  | 100 |

The above mixture, which is compounded for use in connection with aluminum, may be varied considerably, both with respect to the fluxing agents for the barium oxide and to the composition of the disseminating component. Examples of other fluxing agents will occur to those skilled in the art among which may be mentioned barium fluoride, and barium sulphide. As an example of other disseminating mixtures, per se, may be mentioned barium dioxide and carbon, this mixture enabling barium dioxide to be substituted either in whole or in part for the potassium chlorate. In this connection, I have found that the barium dioxide (which yields barium oxide in the bath) undergoes a somewhat milder reaction than the potassium chlorate. Thus, by suitable admixture of barium dioxide with potassium chlorate, the degree of violence of the reaction may be suitably controlled and varied for different conditions of operation. Moreover, by decreasing the amount of potassium chlorate, the fluxing effect of the potassium oxide contained therein will also be decreased.

In adapting the mixture to metals having a higher melting point, the proportion of the fluxing agents will be suitably reduced.

In the above mixture, barium carbonate per se is of less value as a purifying agent than the oxide since its effectiveness is due chiefly to its property of undergoing conversion into the oxide, a reaction, however, which takes place at relatively high temperatures. Moreover, the propelling agent is thought to have a purifying effect per se for the reason that it produces a large volume of gas within the mass of molten metal, this gas itself serving to assist in the removal of both solid and gaseous impurities, not only by bringing them into contact with the purifying agent but also by mechanically bringing them to the surface of the metal.

In carrying out the treatment, the metal will be understood to be in a suitable state of fluidity, as for example while in the ladle prior to pouring. The manner of introducing the mixture may be varied considerably but preferably I accomplish this by bringing the mixture beneath the surface of the liquid by the use of an inverted, cup-shaped element on the end of a pole. Preferably, the mixture is not introduced all at once but in successive increments depending upon the amount of metal in the bath. The amount of the mixture will vary with the amount of metal to be treated and also with the amount of impurities therein. For most purposes a suitable proportion of the composition is two pounds per one thousand pounds metal. After the introduction of the mixture, the bath is allowed to stand several minutes or until ready to pour.

The effect of the removal of the impurities by treatment with my improved mixture is marked and is apparent both from the appearance of the metals so refined and from their physical properties. Thus, the refined metal has a higher and more permanent luster than the untreated metal. Furthermore, examined microscopically, the metal has a much finer grain structure. An example of the difference in physical properties is given in the following tabulation of data obtained on the treated and untreated metal from the same bath.

In order to enable those skilled in the art to practice my invention, I have given a full description of the process at present known to me to be the best, but it will be understood that I do not intend to limit myself to this specific process, but intend to claim the broad principle of my invention in its various applications.

I claim:

1. A composition containing an oxy-barium compound adapted to be admixed with a non-ferrous metal bath, said composition having the propery of melting at the temperature of the bath and of combining with and removing metallic oxides present as impurities and including an ingredient having the property of disseminating said composition throughout the bath.

2. The method of purifying non-ferrous metals which consists in disseminating by gas generated in situ a barium oxide through the molten metal.

3. A composition adapted to be admixed with a non-ferrous metal bath, said composition comprising an oxy-barium compound and an agent generating in the bath a propellant gas.

4. The method of purifying aluminum which consists in disseminating an oxide of barium throughout the liquid metal prior to casting.

5. A composition adapted to be admixed with a non-ferrous metal bath of a temperature around that of the melting point of aluminum, comprising a barium oxide and a barium salt lowering the fusing point of said oxide and including a substance acting on the bath as a propelling agent.

6. A composition adapted to be admixed with a non-ferrous metal bath of a temperature around that of the melting point of aluminum, comprising barium oxide and barium carbonate and including a substance acting in the bath as a propelling agent.

7. A composition adapted to be admixed with a non-ferrous metal bath of a temperature around that of the melting point of aluminum, comprising barium oxide, barium carbonate and a fluoride and including a substance acting in the bath as a propelling agent.

8. The method of purifying non-ferrous metals which consists in disseminating throughout the metal bath a composition comprising an oxy-barium compound having a fusing temperature not higher than the metal bath.

In testimony whereof I have affixed my signature to this specification.

BEN F. HARDESTY.